United States Patent
Chen

(10) Patent No.: US 10,949,191 B2
(45) Date of Patent: Mar. 16, 2021

(54) PATCH-UPGRADE-BASED FILE PROCESSING METHOD AND APPARATUS, TERMINAL, AND STORAGE MEDIUM

(71) Applicant: Huawei Technologies Co., Ltd., Shenzhen (CN)

(72) Inventor: Lei Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/097,492

(22) PCT Filed: Apr. 27, 2016

(86) PCT No.: PCT/CN2016/080342
§ 371 (c)(1),
(2) Date: Oct. 29, 2018

(87) PCT Pub. No.: WO2017/185253
PCT Pub. Date: Nov. 2, 2017

(65) Prior Publication Data
US 2019/0146776 A1  May 16, 2019

(51) Int. Cl.
*G06F 9/44* (2018.01)
*G06F 8/65* (2018.01)
(Continued)

(52) U.S. Cl.
CPC .............. *G06F 8/65* (2013.01); *G06F 8/658* (2018.02); *G06F 9/445* (2013.01);
(Continued)

(58) Field of Classification Search
CPC .................................. G06F 8/65; G06F 8/654
See application file for complete search history.

(56) References Cited

U.S. PATENT DOCUMENTS 8,397,230 B2 * 3/2013 Ewington ................. G06F 8/63
717/168
9,720,674 B1 * 8/2017 Spreha .................. G06F 9/4401
(Continued)

FOREIGN PATENT DOCUMENTS

CN  101026825 A  8/2007
CN  101593118 A  12/2009
(Continued)

OTHER PUBLICATIONS

Pundir, "linaro-android v4.4 topic branch updates", Apr. 7, 2016, pp. 5 (Year: 2016).*

(Continued)

*Primary Examiner* — Duy Khuong T Nguyen
(74) *Attorney, Agent, or Firm* — Conley Rose, P.C.

(57) ABSTRACT

A patch-upgrade-based file processing method includes receiving a file access request, where the file access request includes storage path information, determining whether the storage path information exists in an association relationship between original file path information and patch upgrade file path information when the storage path information indicates a first partition, querying the association relationship to obtain patch upgrade file path information corresponding to the storage path information when the storage path information exists in the association relationship between the original file path information and the patch upgrade file path information, and obtaining, from a target partition indicated by the patch upgrade file path information, a patch upgrade file matching the patch upgrade file path information.

17 Claims, 6 Drawing Sheets

(51) Int. Cl.
  *G06F 8/658* (2018.01)
  *G06F 16/188* (2019.01)
  *G06F 9/445* (2018.01)
  *G06F 16/14* (2019.01)
(52) U.S. Cl.
  CPC ........ *G06F 9/44552* (2013.01); *G06F 16/148* (2019.01); *G06F 16/188* (2019.01)

(56) References Cited

U.S. PATENT DOCUMENTS

| | | | |
|---|---|---|---|
| 9,804,933 B2* | 10/2017 | Wei | G06F 11/1433 |
| 10,055,219 B1* | 8/2018 | Olderdissen | H04L 67/34 |
| 2007/0132774 A1 | 6/2007 | Fan et al. | |
| 2008/0295086 A1 | 11/2008 | Greenwood et al. | |
| 2011/0145807 A1 | 6/2011 | Molinie et al. | |
| 2011/0276695 A1* | 11/2011 | Maldaner | H04L 41/00 709/226 |
| 2012/0192171 A1 | 7/2012 | Tanaka et al. | |
| 2013/0031214 A1 | 1/2013 | Nielsen | |
| 2014/0057620 A1* | 2/2014 | Lin | G06F 8/654 455/418 |
| 2014/0123122 A1 | 5/2014 | Dhanyamraju et al. | |
| 2014/0245282 A1 | 8/2014 | Keith, Jr. | |
| 2015/0220326 A1 | 8/2015 | Jia | |
| 2016/0054990 A1 | 2/2016 | Qin | |
| 2016/0170735 A1* | 6/2016 | Kuo | G06F 8/65 717/169 |
| 2016/0266892 A1* | 9/2016 | Sn | G06F 3/0619 |

FOREIGN PATENT DOCUMENTS

| | | |
|---|---|---|
| CN | 102231116 A | 11/2011 |
| CN | 102662870 A | 9/2012 |
| CN | 102880495 A | 1/2013 |
| CN | 102902630 A | 1/2013 |
| CN | 103514016 A | 1/2014 |
| CN | 104182255 A | 12/2014 |
| CN | 104461685 A | 3/2015 |
| CN | 105446769 A | 3/2016 |
| JP | 2009110505 A | 5/2009 |
| KR | 20110051061 A | 5/2011 |
| RU | 2538911 C2 | 1/2015 |

OTHER PUBLICATIONS

Tizzdz,"nspawn: kernel: overlayfs UID shifts #2404",Jan. 21, 2016,pp. 9 (Year: 2016).*

Jeong, "fs/sdcardfs/super.c",2013,pp. 5 (Year: 2013).*
Machine Translation and Abstract of Chinese Publication No. CN102231116, Nov. 2, 2011, 15 pages.
Machine Translation and Abstract of Chinese Publication No. CN102662870, Sep. 12, 2012, 11 pages.
Machine Translation and Abstract of Chinese Publication No. CN102902630, Jan. 30, 2013, 12 pages.
Machine Translation and Abstract of Chinese Publication No. CN104461685, Mar. 25, 2015, 23 pages.
Machine Translation and Abstract of Chinese Publication No. CN105446769, Mar. 30, 2016, 16 pages.
Boie, A., "Lollipop MR1 Verified Boot," Open Source Technology Center, Intel Corporation, Retrieved from the internet on Dec. 11, 2018, https://elinux.org/images/b/b2/Android_Verified_Boot.pdf, 19 pages.
Foreign Communication From a Counterpart Application No. PCT/CN2016/080342, English Translation of International Search Report dated Feb. 6, 2017, 2 pages.
Foreign Communication From a Counterpart Application No. PCT/CN2016/080342, English Translation of Written Opinion dated Feb. 6, 2017, 6 pages.
Foreign Communication From a Counterpart Application, European Application No. 16899766.6, Extended European Search Report dated Mar. 26, 2019, 9 pages.
Foreign Communication From a Counterpart Application, Russian Application No. 2018141437, Russian Office Action dated Aug. 15, 2019, 9 pages.
Foreign Communication From a Counterpart Application, Russian Application No. 2018141437, English Translation of Russian Office Action dated Aug. 22, 2019, 5 pages.
Foreign Communication From a Counterpart Application, Japanese Application No. 2018-556437, Japanese Office Action dated Oct. 8, 2019, 3 pages.
Foreign Communication From a Counterpart Application, Japanese Application No. 2018-556437, English Translation of Japanese Office Action dated Oct. 8, 2019, 3 pages.
Machine Translation and Abstract of Chinese Publication No. CN101593118, Dec. 2, 2009, 9 pages.
Machine Translation and Abstract of Chinese Publication No. CN102880495, Jan. 16, 2013, 16 pages.
Machine Translation and Abstract of Chinese Publication No. CN103514016, Jan. 15, 2014, 12 pages.
Machine Translation and Abstract of Chinese Publication No. CN104182255, Dec. 3, 2014, 16 pages.
Foreign Communication From a Counterpart Application, Chinese Application No. 201680017677.3, Chinese Office Action dated Nov. 22, 2019, 7 pages.

* cited by examiner

PATCH-UPGRADE-BASED FILE PROCESSING METHOD AND APPARATUS, TERMINAL, AND STORAGE MEDIUM

CROSS-REFERENCE TO RELATED APPLICATIONS

This application is a U.S. National Stage of International Patent Application No. PCT/CN2016/080342 filed on Apr. 27, 2016, which is hereby incorporated by reference in its entirety.

TECHNICAL FIELD

The present disclosure relates to the field of communications technologies, and in particular, to a patch-upgrade-based file processing method and apparatus, a terminal, and a storage medium.

BACKGROUND

Software of terminals such as a mobile phone and a tablet computer needs to be continuously upgraded, so as to add and develop functions of the terminals. Currently, there are generally two software upgrade modes: full image reversion upgrade and differential package upgrade. In the full image reversion upgrade mode, an upgrade package includes all system files. During an upgrade process, all original system files in a terminal are erased, and then the original system files are replaced with new files (that is, the system files in the upgrade package), so that upgrade is completed. In the differential package upgrade mode, an upgrade package includes differential data between two versions. The differential data may be used to upgrade a specified version A to a specified version B. In the two upgrade modes, the upgrade package in the full image reversion upgrade is generally large, and is not suitable for wireless upgrade. Therefore, currently the differential package upgrade mode is usually used.

In addition, in the existing differential package upgrade mode, after a software version of a terminal is released, sometimes there is an emergency bug that can be fixed by modifying a few parameters. Therefore, in the existing differential package upgrade mode, the bug may be fixed in the following two modes: First, as shown in FIG. 1, currently released earlier versions are B101, B102, and B103. Each of these versions has the foregoing emergency bug. Based on a currently released latest version (B103), a server releases a patch package that includes a small patch. When a user wants to fix the bug, the user needs to first upgrade a current version (for example, B101 or B102) to the latest version (B103), and then may download the patch package to fix the bug. For example, when a version currently used by the user is B101, the user first downloads an upgrade package B101→B102 to upgrade the version to B102, then downloads an upgrade package B102→B103 to upgrade the version to B103, and finally downloads the patch package that includes the small patch, to upgrade the version to a version B104 in which the emergency bug is fixed. Second, as shown in FIG. 2, based on all earlier versions (B101, B102, and B103), a server releases upgrade packages (an upgrade package B101→B104, an upgrade package B102→B104, and a patch package that includes a small patch) that can be used to upgrade the earlier versions to a latest version that includes the patch; the user may directly download an upgrade package specific to a current version, and upgrade, at a time, the version to a version in which the emergency bug is fixed. Still in the example in which the user currently uses the version B101, and the user may download the upgrade package B101→B104 to directly upgrade the current version B101 to the version B104 in which the emergency bug is fixed.

However, in the first upgrade mode, the patch package is released based on a latest version, and when the user upgrades a current version to the latest version, the user can fix the bug by using the patch package. In the foregoing example, the user who currently uses the version B101 needs to consecutively perform upgrading twice, and after upgrading the version to B103, the user can fix the bug by using the patch package. Consequently, a requirement for quick upgrading by using a small patch cannot be met. In the second upgrade mode, the bug can be fixed at a time for each earlier version. However, a relatively large upgrade package is for upgrading a much earlier version to the latest version that includes the patch. In the foregoing example, the upgrade package B101→B104 used by the user who currently uses the version B101 includes not only the patch for fixing the foregoing emergency bug but also patch information included in the upgrade packages B101→B102 and B102→B103. Therefore, the upgrade package is extremely large, and consequently upgrading is relatively slow. In addition, a requirement for quick upgrading by using a small patch is not met, and the server needs to release multiple upgrade packages for the earlier versions, which results in huge workload.

SUMMARY

The present disclosure provides a patch-upgrade-based file processing method and apparatus, a terminal, and a storage medium, so as to implement quick upgrading by using a small patch and reduce workload.

According to a first aspect, an embodiment of the present disclosure provides a patch-upgrade-based file processing method, including: receiving a file access request, wherein the file access request comprises storage path information; determining whether the storage path information exists in an association relationship that is between original file path information and patch upgrade file path information when the storage path information indicates a first partition, wherein the patch upgrade file path information is in a preconfigured system; querying the association relationship to obtain patch upgrade file path information corresponding to the storage path information when the storage path information exists in the association relationship that is between the original file path information and the patch upgrade file path information; and obtaining, from a target partition that is indicated by the patch upgrade file path information, a patch upgrade file that matches the patch upgrade file path information.

According to the file processing method provided in the first aspect, when an original file is accessed, a patch file is accessed according to path information, so as to implement software patch upgrading. A patch package based on this upgrade method may include a patch file used to fix an emergency bug, so that the patch package is relatively small. A terminal can quickly obtain path information in the patch package, and when the original file is accessed, directly access the patch file according to the path information, so that an upgrading speed is high. In addition, there is no need to prepare multiple upgrade packages for earlier versions, so that workload is small.

In a possible implementation of the first aspect, before the receiving a file access request, the method further includes:

obtaining a patch package; and saving the patch package in a second partition when the patch package comprises an emergency patch package identifier; wherein the obtaining operation comprises: obtaining, from the second partition, the patch upgrade file that matches the patch upgrade file path information.

According to the file processing method provided in this embodiment, after the patch package is obtained, if the patch package includes the emergency patch package identifier, the patch package is saved in the second partition, so as to implement an emergency patch upgrade method different from an existing full image reversion or differential upgrade manner by using the second partition. In addition, check protection may be performed on the first partition, so that system security is improved.

In a possible implementation of the first aspect, after the saving the patch package in a second partition, the method further includes: if the patch package includes a parameter modification script, obtaining an original file from the first partition for processing, and generating the patch upgrade file in the second partition.

According to the file processing method provided in this embodiment, after the patch package is saved in the second partition, it is determined whether the patch package includes the parameter modification script, so that a parameter of a parsable file can be modified by using the parameter modification script, so as to fix the bug, and this embodiment is applicable to a wider scope.

In a possible implementation of the first aspect, after the generating the patch upgrade file in the second partition, the method further includes: saving the generated patch upgrade file in a third partition; and the obtaining operation comprises: obtaining, from the third partition, the patch upgrade file that matches the patch upgrade file path information.

According to the file processing method provided in this embodiment, the patch package is saved in the third partition, so that check protection can be performed on the second partition, and the system security is further improved.

In a possible implementation of the first aspect, after the saving the patch package in a second partition, the method further includes: saving, in the preconfigured system, an association relationship that is between original file path information and patch upgrade file path information and that is in the patch package in the second partition.

In a possible implementation of the first aspect, the obtaining an original file from the first partition for processing, and generating the patch upgrade file in the second partition specifically includes: mounting the first partition in which the original file is located, and reading the original file in the first partition; parsing the original file, to obtain parameter information of the original file; and modifying a to-be-modified parameter in the parameter information, to generate the patch upgrade file.

In a possible implementation of the first aspect, the preconfigured system is an intermediate virtual file system.

According to the file processing method provided in this embodiment, it is convenient for a system to implement file jump access by using the virtual file system, so as to upgrade an emergency patch when a file in the first partition is not modified.

According to a second aspect, an embodiment of the present disclosure provides a patch-upgrade-based file processing apparatus, including: a receiving module, configured to receive a file access request, wherein the file access request comprises storage path information; a determining module, configured to: configured to determine whether the storage path information exists in an association relationship that is between original file path information and patch upgrade file path information when the storage path information indicates a first partition, wherein the patch upgrade file path information is in a preconfigured system; a first obtaining module, configured to query the association relationship to obtain patch upgrade file path information corresponding to the storage path information when the storage path information exists in the association relationship that is between the original file path information and the patch upgrade file path information; and a second obtaining module, configured to obtain, from a target partition that is indicated by the patch upgrade file path information, a patch upgrade file that matches the patch upgrade file path information.

Based on a same disclosure concept, for a problem-resolving principle and beneficial effects of the apparatus, refer to the first aspect, the possible implementations of the first aspect, and beneficial effects brought by the first aspect and the possible implementations of the first aspect. In addition, for implementations of the apparatus, refer to the implementations of the method. Details are not described herein again.

According to a third aspect, an embodiment of the present disclosure provides a terminal, including at least one processor; and at least one memory, the at least one memory comprising instructions that when executed by the at least one processor, cause the apparatus to perform, at least, the following: receive a file access request, wherein the file access request comprises storage path information; determine whether the storage path information exists in an association relationship that is between original file path information and patch upgrade file path information when the storage path information indicates a first partition, wherein the patch upgrade file path information is in a preconfigured system; query the association relationship to obtain patch upgrade file path information corresponding to the storage path information when the storage path information exists in the association relationship that is between the original file path information and the patch upgrade file path information; and obtain, from a target partition that is indicated by the patch upgrade file path information, a patch upgrade file that matches the patch upgrade file path information.

The processor invokes the instruction saved in the memory, so as to implement the solution designed in the method of the first aspect. For problem-resolving implementations and beneficial effects of the terminal, refer to the first aspect, the possible implementations of the first aspect, and beneficial effects of the first aspect and the possible implementations of the first aspect. In addition, for implementations of the terminal, refer to the implementations of the method. Details are not described herein again.

According to a fourth aspect, an embodiment of the present disclosure provides a nonvolatile computer readable storage medium that includes a computer execution instruction, where the computer execution instruction is used to enable the terminal to perform the method according to the first aspect. Details are not described herein.

According to the patch-upgrade-based file processing method and apparatus, the terminal, and the storage medium provided in embodiments of the present disclosure, after the terminal receives the file access request, when the storage path information in the file access request indicates the first partition, the terminal first determines whether the storage path information exists in the association relationship that is between the original file path information and the patch upgrade file path information and that is in the preconfigured system. If the storage path information exists in the association relationship, the terminal obtains, according to the association relationship, the patch upgrade file path information corresponding to the storage path information, and then accesses and obtains the corresponding patch upgrade file according to the patch upgrade file path information. Based on this file processing manner, when the original file is accessed, the terminal accesses the patch file according to the path information, so as to implement software patch upgrading. The patch package in the embodiments may include the patch file used to fix the emergency bug. Therefore, the patch package is relatively small, and the terminal can quickly obtain the path information in the patch package, and when the original file is accessed, directly access the patch file according to the path information, so that the upgrading speed is fast. In addition, there is no need to prepare multiple upgrade packages for the earlier versions, so that the workload is small.

BRIEF DESCRIPTION OF DRAWINGS

To describe the technical solutions in the embodiments of the present disclosure more clearly, the following briefly describes the accompanying drawings for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

It should be understood that, in the embodiments of the present disclosure, a terminal may be referred to as user equipment (User Equipment, UE for short), a mobile station (Mobile Station, MS for short), a mobile terminal (Mobile Terminal), a computer, a micro computer, an electronic device, and the like. The terminal may communicate with one or more core networks by using a radio access network (Radio Access Network, RAN for short). For example, the terminal may be a mobile phone (also referred to as a "cellular" phone) and a computer with a mobile terminal, or may be a portable, pocket-sized, handheld, computer built-in, or in-vehicle mobile apparatus, which exchanges voice and/or data with the radio access network. This is not limited in the present disclosure. For example, the terminal may further include a wired-access terminal with a multi-carrier feature.

Figure 3:
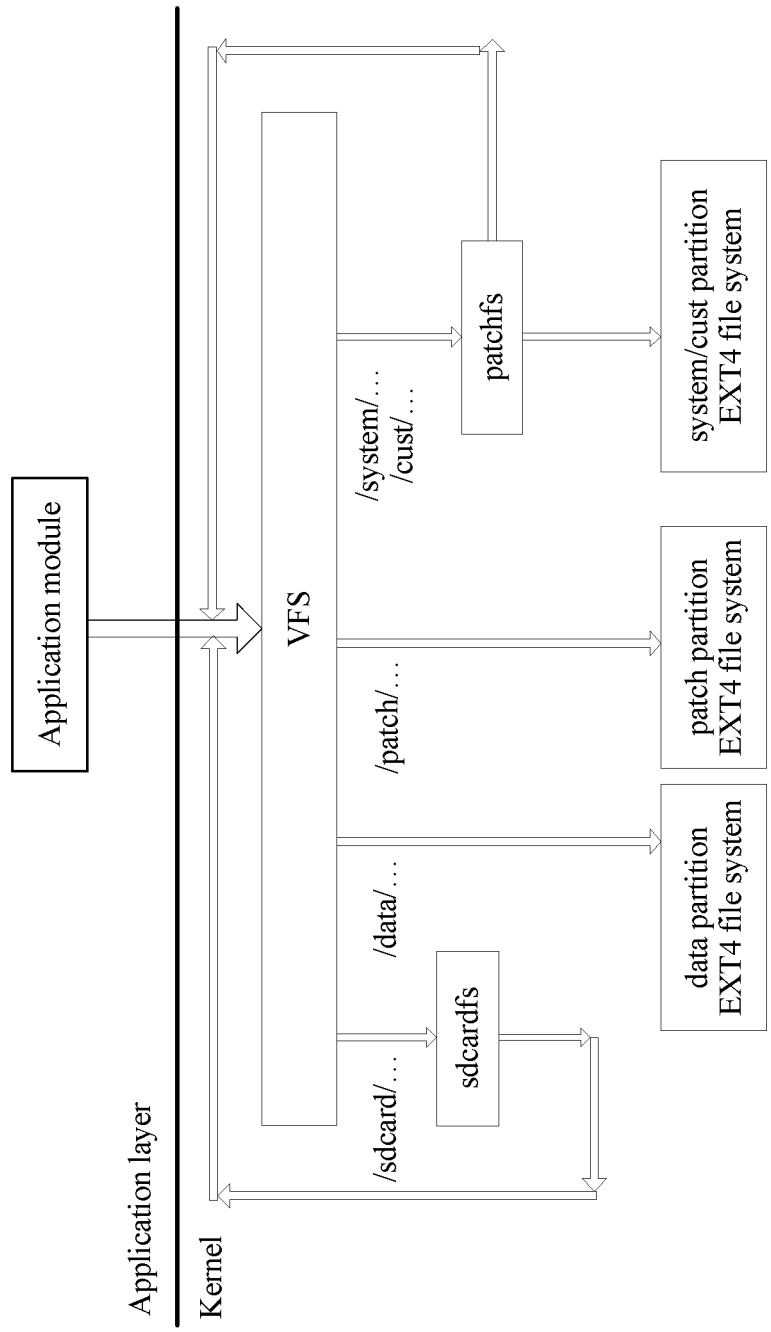
FIG. 3 is a schematic diagram of a system architecture of a terminal according to the present disclosure.

FIG. 3 is a schematic diagram of a system architecture of a terminal according to the present disclosure. As shown in FIG. 3, the terminal includes an application module at an application layer, a virtual file system (Virtual File System, VFS for short) in a kernel, an intermediate virtual file system (such as sdcardfs or patchfs), and various storage partitions in a hard disk. The various storage partitions (such as a data partition, a patch partition, and a system partition) save, by using a fourth extended filesystem (Fourth extended filesystem, EXT4 for short) or another file system, various files for running the system. When the application module at the application layer accesses the files, the VFS may directly access the files, or access the files by using the intermediate virtual file system, and feed back the files to the application module.

Figure 4:
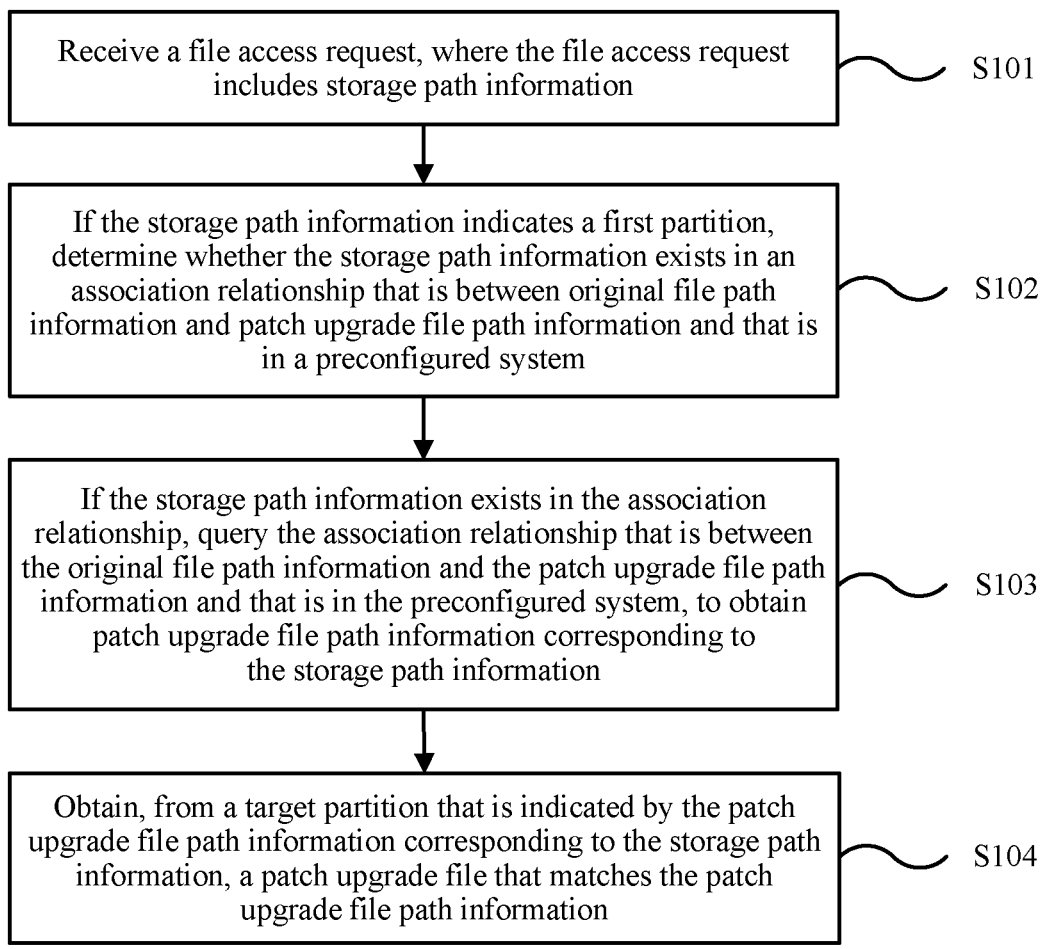
FIG. 4 is a schematic flowchart of Embodiment 1 of a patch-upgrade-based file processing method according to the present disclosure.

FIG. 4 is a schematic flowchart of Embodiment 1 of a patch-upgrade-based file processing method according to the present disclosure. This embodiment may be performed by a patch-upgrade-based file processing apparatus or a terminal. As shown in FIG. 4, the method provided in this embodiment includes the following steps.

Step S101: Receive a file access request, where the file access request includes storage path information.

Specifically, when accessing a file, an application program at an application layer sends the file access request to a common file access interface VFS in the terminal. The file access request includes the storage path information, that is, a path in which a file that the application program intends to access is saved. After receiving the storage path information, the VFS may provide, for the application program, the file that the application program intends to access.

Step S102. If the storage path information indicates a first partition, determine whether the storage path information exists in an association relationship that is between original file path information and patch upgrade file path information and that is in a preconfigured system.

Specifically, in this embodiment, after obtaining a patch upgrade file, the terminal may save the patch upgrade file in a partition, and then save, in a path table of the preconfigured system, the association relationship between the original file path information (that is, a path in which an original file is saved) and the patch upgrade file path information (that is, a path in which the patch upgrade file is saved). The preconfigured system may be an intermediate virtual file system, for example, a file system such as overlayFS, SDcardFS, or patchFS.

After receiving the storage path information, the VFS may learn a partition indicated by the storage path information. If the storage path information indicates the first partition (a partition in which an original file with a bug is located), it means that a to-be-accessed file corresponding to the storage path information may be the original file with a bug. In this case, the VFS first accesses the preconfigured system, queries the path table, and determines whether the storage path information exists in the association relationship that is between the original file path information and the patch upgrade file path information and that is in the preconfigured system, so as to determine whether the to-be-accessed file corresponding to the storage path information is the original file with a bug.

Step S103: If the storage path information exists in the association relationship, query the association relationship that is between the original file path information and the patch upgrade file path information and that is in the preconfigured system, to obtain patch upgrade file path information corresponding to the storage path information.

If the storage path information exists in the association relationship between the original file path information and the patch upgrade file path information, it indicates that the to-be-accessed file corresponding to the storage path information is the original file with a bug. In this case, the patch upgrade file path information corresponding to the storage path information is obtained according to the association relationship, so as to access the patch upgrade file. Alternatively, if the storage path information does not exist in the association relationship between the original file path information and the patch upgrade file path information, it indicates that the to-be-accessed file corresponding to the storage path information is not the original file with a bug. In this case, a corresponding file in the first partition may be directly accessed according to the storage path information.

Step S104: Obtain, from a target partition that is indicated by the patch upgrade file path information corresponding to the storage path information, a patch upgrade file that matches the patch upgrade file path information.

After obtaining the patch upgrade file path information corresponding to the storage path information, the VFS may obtain, according to the patch upgrade file path information from the target partition indicated by the patch upgrade file path information, the patch upgrade file that matches the patch upgrade file path information, and provide the patch upgrade file for the application program.

The target partition may be specifically the first partition, or may be another partition different from the first partition. The first partition may be specifically a system partition or a cust partition. The target partition may be specifically a system partition, a cust partition, a data partition, a patch partition, an RAMFS, or the like.

To better understand the technical solutions of the present disclosure, an example of upgrading /system/framework/a.jar and /cust/preinstalled/public/lib/b.so is used for description in the following.

Figure 5:
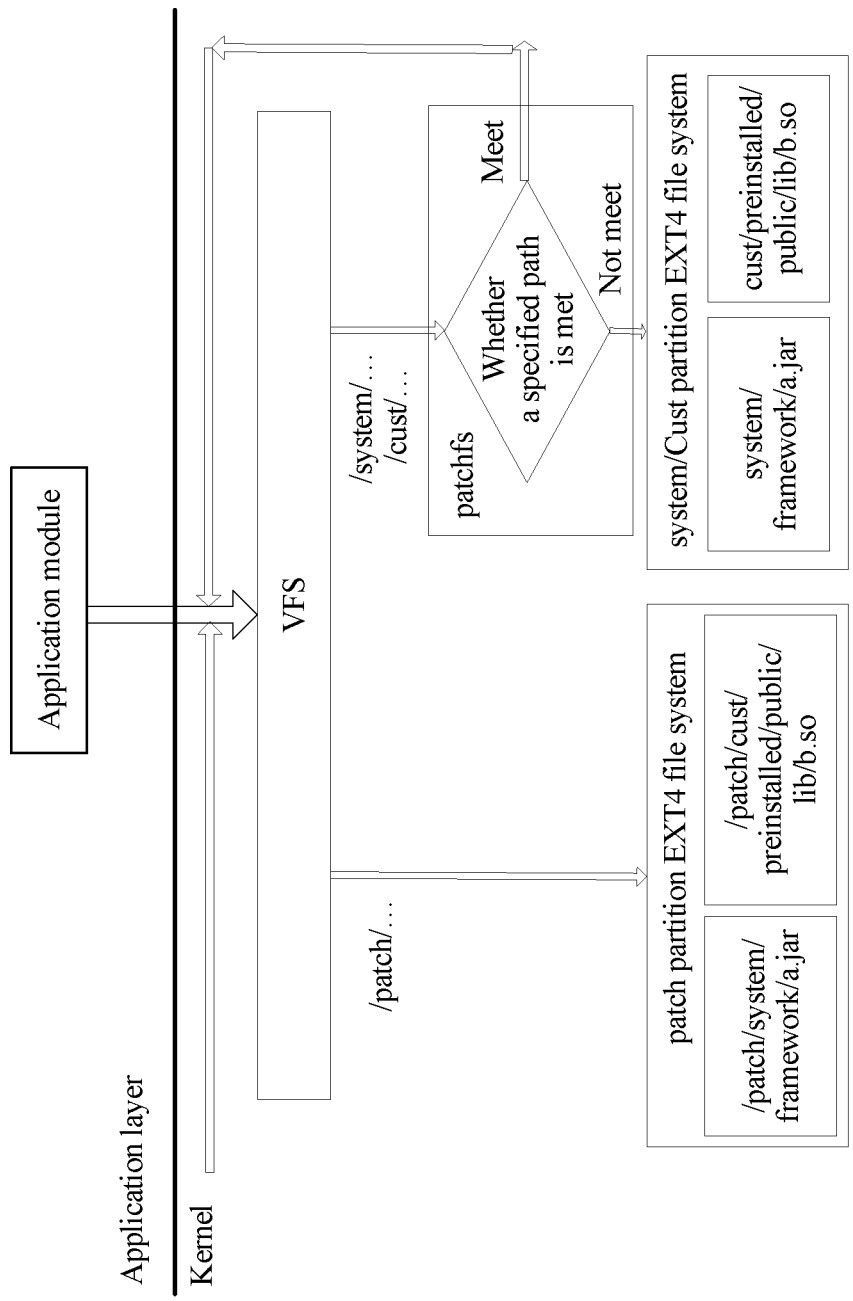
FIG. 5 is a schematic structural diagram of a system for file patch upgrading according to the present disclosure.

FIG. 5 is a schematic structural diagram of a system for file patch upgrading according to the present disclosure. As shown in FIG. 5, the /system/framework/ajar file in the system partition (the first partition) and the /cust/preinstalled/public/lib/b.so file in the cust partition (the first partition) have emergency bugs that need to be fixed, and patch files in which the bugs are fixed are saved in the patch partition (the target partition) and are: /patch/system/framework/a.jar and /patch/cust/preinstalled/public/lib/b.so. When the system partition and the cust partition are accessed, the VFS first accesses patchfs (the preconfigured system), and determines, according to a path information association relationship in a path table, whether the storage path information of the file that the application program intends to access meets a specified path (that is, whether the file that the application program intends to access is /system/framework/a.jar or /cust/preinstalled/public/lib/b.so). If the storage path information meets the specified path, the VFS jumps to the patch partition to access a corresponding patch file according to /patch/system/framework/a.jar or /patch/cust/preinstalled/public/lib/b.so. If the storage path information does not meet the specified path, the VFS accesses a file in the system partition or the cust partition according to the storage path information of the file that the application program intends to access.

Earlier versions of a majority of files in the system partition and the cust partition (that is, the first partition) in the terminal are almost never changed. A file in a later version may effectively work in all earlier versions, for example, a *.so file. Alternatively, although an earlier version of a file is frequently modified, the file has great decoupling compatibility, and may be directly replaced with a file in a later version, for example, a *.apk file. That is, these files in all the earlier versions may be replaced with a common updated file. Software upgrading is generally specific to a file in the system partition. An example in which the file in the system partition is upgraded is used to illustrate the technical solutions of the present disclosure.

When files in the system partition have emergency bugs, in the prior art, the files are upgraded in a differential package upgrade mode. In a first manner of the differential package upgrade mode, a patch package that includes a patch is released based on a latest version. In this manner, when the user upgrades a current version to the latest version, the bug can be fixed by using the patch package; therefore, an upgrading speed is extremely slow. In a second manner of the differential package upgrade mode, based on all earlier versions, upgrade packages that can be used to upgrade the earlier versions to a latest version including the patch are released. In this manner, because an original file in the system partition is directly modified for upgrading in the differential package upgrade mode, for a much earlier version, instead of preparing a differential package that includes a patch, a differential package (that is, an upgrade package) that can be used to upgrade the earlier version to the latest version including the patch needs to be prepared, so as to avoid a case in which the earlier version cannot be upgraded to the latest version by using the released upgrade package because the original file in the system partition is modified due to patch upgrading. Therefore, the differential package is relatively large, which results in a relatively slow upgrading speed. In addition, the earlier versions are corresponding to different differential packages, and not all the earlier versions can be directly covered by a common differential file. Therefore, multiple upgrade packages need to be released for the earlier versions, which results in heavy workload.

In this embodiment, after the VFS in the terminal receives the file access request, when the storage path information in the file access request indicates the first partition, that is, the system partition, the terminal first determines whether the storage path information exists in the association relationship that is between the original file path information and the patch upgrade file path information and that is in the preconfigured system. If the storage path information exists in the association relationship, the terminal obtains, according to the association relationship, the patch upgrade file path information corresponding to the storage path information, and then obtains the corresponding patch upgrade file according to the patch upgrade file path information. That is, when the original file with a bug is accessed, the terminal may jump to the partition in which the patch upgrade file is located to access the patch upgrade file. Based on this file processing manner, a patch upgrade file included in a patch package may be directly an upgraded original file, and may be saved in a path different from that of the original file. When the original file is accessed, the terminal directly accesses the patch upgrade file according to the obtained path information, so as to implement software patch upgrading. The terminal does not need to modify the original file in the system partition. Therefore, when the user needs to upgrade an earlier version to a latest version, the user may directly delete the patch package, and upgrade the current version by using a released differential package, so as to avoid a case in which the earlier version cannot be upgraded to the latest version by using a released upgrade package due to patch upgrading. That is, in this embodiment, the patch package may include a patch file used to fix the emergency bug. In addition, all the earlier versions may use the same patch package. The patch file in the patch package may cover all the earlier versions, and there is no need to prepare multiple upgrade packages for the earlier versions. Therefore, the patch package is relatively small, and the terminal can quickly obtain path information in the patch package, and when the original file is accessed, directly access a patch file according to the obtained path information, so that an upgrading speed is fast and workload is small.

According to the patch-upgrade-based file processing method provided in this embodiment, after the terminal receives the file access request, when the storage path information in the file access request indicates the first partition, the terminal first determines whether the storage path information exists in the association relationship that is between the original file path information and the patch upgrade file path information and that is in the preconfigured system. If the storage path information exists in the association relationship, the terminal obtains, according to the association relationship, the patch upgrade file path information corresponding to the storage path information, and then obtains the corresponding patch upgrade file according to the patch upgrade file path information. Based on this file processing manner, when the original file is accessed, the terminal accesses the patch file according to the path information, so as to implement software patch upgrading. The patch package in this embodiment may include the patch file used to fix the emergency bug. Therefore, the patch package is relatively small, and the terminal can quickly obtain the path information in the patch package, and when the original file is accessed, directly access the patch file according to the path information, so that the upgrading speed is fast. In addition, there is no need to prepare multiple upgrade packages for the earlier versions, so that the workload is small.

Figure 6:
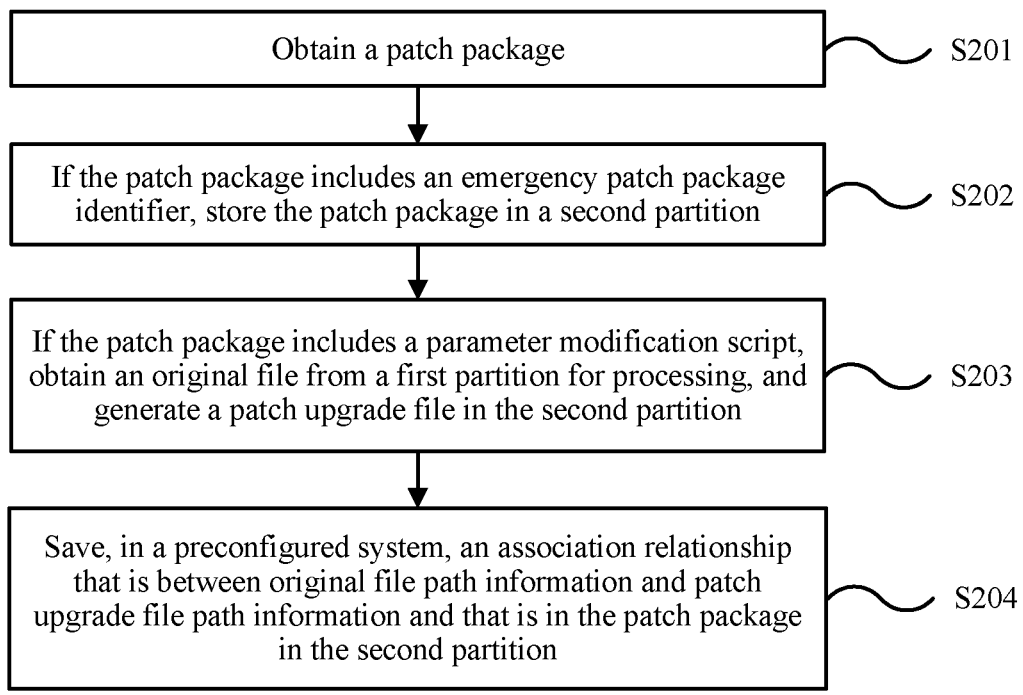
FIG. 6 is a schematic flowchart of Embodiment 2 of a patch-upgrade-based file processing method according to the present disclosure.

FIG. 6 is a schematic flowchart of Embodiment 2 of a patch-upgrade-based file processing method according to the present disclosure. This embodiment shows a specific process of obtaining and processing the accessed patch package in the embodiment shown in FIG. 4. Based on the embodiment shown in FIG. 4, as shown in FIG. 6, before step S101, the method of this embodiment further includes the following steps.

Step S201: Obtain a patch package.

Specifically, the patch package may be a patch package obtained from a server based on an over-the-air (Over-the-Air, OTA for short) technology, or may be a patch package obtained from another device (such as a desktop computer) in a wired manner. The obtaining the patch package based on OTA may be specifically as follows: A terminal actively sends an upgrade query request message to the server; the server queries, according to the request message, whether there is a patch package that conforms to a current version of the terminal; and if there is the patch package that conforms to the current version of the terminal, the server sends the patch package to the terminal. Alternatively, the server may actively send a broadcast notification message to the terminal, to prompt the terminal whether to be upgraded; and if the terminal chooses to be upgraded, the server sends the patch package to the terminal.

Step S202: If the patch package includes an emergency patch package identifier, save the patch package in a second partition.

Specifically, the patch package may include the emergency patch package identifier, so as to distinguish the patch package from another upgrade package. For example, the emergency patch package identifier may be patch. After the terminal obtains an upgrade package, if an identifier of a patch package is patch, the terminal saves the patch package in a predetermined security partition.

The predetermined security partition may be a first partition, or may be the second partition different from the first partition. To ensure system security, check protection may be performed on files in a system partition and a cust partition (that is, the first partition) by using a verified boot (verified boot) function of Google, so that the system partition and the cust partition cannot be upgraded by means of files. The terminal may additionally add a safe patch partition, and use the safe patch partition as the second partition. After obtaining a patch package, the terminal saves the obtained patch package in the additionally added patch partition, so as to improve the system security.

Specifically, after obtaining the patch package, the terminal may save the patch package in a cache partition. Then, the terminal is restarted to enter a recovery mode, and saves the patch package in the second partition. The terminal may also directly save the patch package in the second partition. In some embodiments, the terminal first saves the patch package in the cache partition, and then enters the recovery mode and saves the patch package in the second partition, so as to improve the system security.

In addition, the patch package may include a patch upgrade file. After the patch package is saved in the second partition, the target partition indicated by the patch upgrade file path information is the second partition. Therefore, a possible manner for implementing the foregoing step 104 of obtaining, from a target partition indicated by the corresponding patch upgrade file path information, a patch upgrade file that matches the patch upgrade file path information is as follows:

obtaining, from the second partition, the patch upgrade file that matches the patch upgrade file path information.

It should be noted that the patch upgrade file in the patch package in this embodiment is different from a patch upgrade file in an existing full image reversion upgrade package or differential package. The patch upgrade file in this embodiment is an upgraded original file, that is, a bug-fixed original file. The patch upgrade file in the patch package may be processed by using an existing signature mechanism. That is, signature checking is performed on the patch package when the patch package is written into a safe partition. Certainly, the patch package may also be processed by using another existing packaging technology. This is not limited herein.

Step S203: If the patch package includes a parameter modification script, obtain an original file from a first partition for processing, and generate a patch upgrade file in the second partition.

A small quantity of files in all versions in the system partition cannot be replaced with a common patch file, but specified content in the files may be directly modified by using a parsing statement, for example, a *.xml file, a *.prop file, and a *.txt file. A build.prop file is used as an example. The file includes version number information of all versions. Therefore, build.prop in all earlier versions cannot be replaced with a new build.prop, but the file may be directly parsed, so as to modify one prop item of the file.

In this case, in this embodiment, the patch package may include the parameter modification script. A to-be-modified parameter in the original file is modified by using the parameter modification script, to generate a new file (that is, the patch upgrade file).

Specifically, after the terminal saves the patch package in the second partition, each time the terminal is started, the second partition may be mounted in an init process by using a mount command, so as to validate a file in the second partition. Then, the terminal may read the file in the patch package. When finding that the patch package includes the parameter modification script, the terminal obtains the original file from the first partition for processing, and generates the patch upgrade file in the second partition. More specifically, a process in which the terminal performs the parameter modification script and generates the patch upgrade file is as follows: The terminal first mounts the first partition in which the original file is located, reads the original file in the first partition, then parses the original file, and obtains parameter information of the original file. After finding a to-be-modified parameter in the parameter information, the terminal modifies the to-be-modified parameter in the parameter information, and then generates the patch upgrade file.

After the patch upgrade file is generated, the patch upgrade file may be saved in a data partition, a patch partition, or an RAMFS. Data in the data partition is easy to tamper. Therefore, to ensure system security, the patch upgrade file may be saved in the patch partition or the RAMFS. A manner of saving the patch upgrade file in the RAMFS is applicable to a version such as Google M in which check protection is performed on a read-only partition (that is, the patch partition) of a system. A file in the RAMFS disappears during system startup, and in this manner, each time the terminal is started, a new file is automatically generated and saved in the RAMFS. If the terminal does not use the version of Google M, the terminal may directly save the patch upgrade file in the patch partition, and load the patch partition each time the terminal is started.

In some embodiments, the generated patch upgrade file is saved in a third partition (that is, the RAMFS), so as to further improve the system security. In this case, another possible manner for implementing the foregoing step S104 of obtaining, from a target partition indicated by the corresponding patch upgrade file path information, a patch upgrade file that matches the patch upgrade file path information is as follows:

obtaining, from the third partition, the patch upgrade file that matches the patch upgrade file path information.

In this embodiment, the patch package may include the patch upgrade file or the parameter modification script, or may include both the parameter modification script and the patch upgrade file. The patch package is specifically prepared according to an actual requirement.

Step S204: Save, in a preconfigured system, an association relationship that is between original file path information and patch upgrade file path information and that is in the patch package in the second partition.

The patch package may include the path information (that is, a path in which the original file is saved) of the original file corresponding to the patch upgrade file. After saving the patch package in the second partition, the terminal may read the path information of the original file corresponding to the patch upgrade file in the patch package, and obtain the patch upgrade file path information (that is, a path in which the patch upgrade file is saved) according to a location in which the patch upgrade file is saved. Certainly, the patch upgrade file path information may be directly encapsulated in the patch package. After obtaining the patch package, the terminal saves the patch package in a corresponding location, and then read the patch package to obtain all path information.

After obtaining the original file path information and the patch upgrade file path information, the terminal may save, in the preconfigured system, the association relationship between the original file path information and the patch upgrade file path information. The preconfigured system is an intermediate virtual file system that is used for subsequent file jump access.

An existing intermediate virtual file system such as an intermediate virtual file system implemented by using an overlayFS technology or an technology has a corresponding partition association relationship. To facilitate system design and file jump access, the terminal may additionally add an intermediate virtual file system patchFS in the system directly, and use the intermediate virtual file system patchFS as the preconfigured system in this embodiment, and then associate the patchFS with the system partition. After obtaining the original file path information and the patch upgrade file path information, the terminal mounts the patchFS, and saves the path information in a path table in a memory corresponding to the patchFS. When the original file is accessed, the terminal may be guided, by using the path table, to access a file in the target partition. The patchFS may be implemented by using an existing overlayFS technology or SDcardFS technology.

It should be noted that there is no strict time sequence between step S204 and step S203. Step S204 may be performed before step S203. A specific sequence of performing step S203 and step S204 is not limited in this embodiment.

According to the patch-upgrade-based file processing method provided in this embodiment, after the terminal obtains the patch package, if the patch package includes the emergency patch package identifier, the terminal saves the patch package in the second partition, and then stores, in the preconfigured system, the association relationship that is between the original file path information and the patch upgrade file path information and that is in the patch package in the second partition, so as to validate, by using the second partition and the preconfigured system, the patch package used to fix an emergency bug. In the technical solution of this embodiment, the patch package is saved in the second partition, so that the system security is improved. In addition, after the patch package is saved in the second partition, it is determined whether the patch package includes the parameter modification script, so that a parameter of a parsable file can be modified by using the parameter modification script, so as to fix the bug, and this embodiment is applicable to a wider scope.

Figure 7:
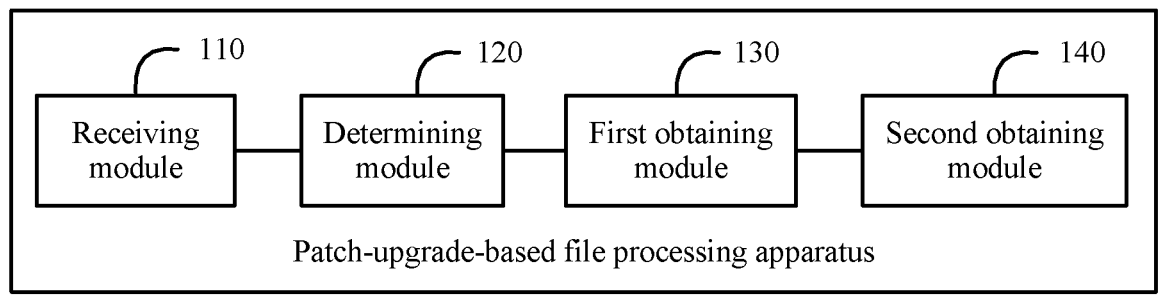
FIG. 7 is a schematic structural diagram of Embodiment 1 of a patch-upgrade-based file processing apparatus according to the present disclosure.

FIG. 7 is a schematic structural diagram of Embodiment 1 of a patch-upgrade-based file processing apparatus according to the present disclosure. The apparatus provided in this embodiment may be integrated in a terminal. As shown in FIG. 7, the apparatus provided in this embodiment includes:

a receiving module 110, configured to receive a file access request, where the file access request includes storage path information;

a determining module 120, configured to: if the storage path information indicates a first partition, determine whether the storage path information exists in an association relationship that is between original file path information and patch upgrade file path information and that is in a preconfigured system;

a first obtaining module 130, configured to: if the storage path information exists in the association relationship that is between the original file path information and the patch upgrade file path information and that is in the preconfigured system, query the association relationship that is between the original file path information and the patch upgrade file path information and that is in the preconfigured system, to obtain patch upgrade file path information corresponding to the storage path; and a second obtaining module 140, configured to obtain, from a target partition that is indicated by the patch upgrade file path information corresponding to the storage path information, a patch upgrade file that matches the patch upgrade file path information.

The apparatus provided in this embodiment can perform the foregoing method embodiments, and implementation principles and technical effects of the apparatus are similar and are not described herein again.

Figure 8:
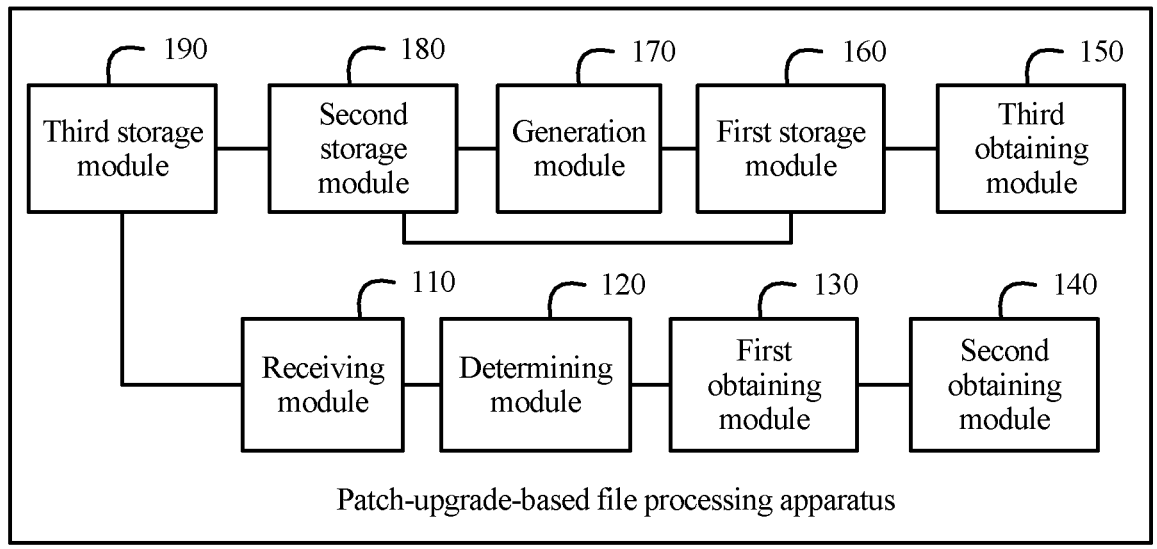
FIG. 8 is a schematic structural diagram of Embodiment 2 of a patch-upgrade-based file processing apparatus according to the present disclosure.

FIG. 8 is a schematic structural diagram of Embodiment 2 of a patch-upgrade-based file processing apparatus according to the present disclosure. This embodiment further describes functions of the apparatus in the embodiment shown in FIG. 7. Based on the embodiment shown in FIG. 7, as shown in FIG. 8, the apparatus in this embodiment further includes:

a third obtaining module 150, configured to obtain a patch package; and a first storage module 160, configured to: if the patch package includes an emergency patch package identifier, save the patch package in a second partition, where the second obtaining module 140 is specifically configured to obtain, from the second partition, the patch upgrade file that matches the patch upgrade file path information.

Optionally, the apparatus in this embodiment further includes: a generation module 170, configured to: if the patch package includes a parameter modification script, perform the parameter modification script, and after an original file is obtained from the first partition and is processed, generate the patch upgrade file in the second partition.

In a possible implementation of the present disclosure, the apparatus in this embodiment further includes: a second storage module 180, configured to save the generated patch upgrade file in a third partition. The second obtaining module 140 is specifically configured to obtain, from the third partition, the patch upgrade file that matches the patch upgrade file path information.

Optionally, the apparatus in this embodiment further includes a third storage module 190, configured to save, in the preconfigured system, an association relationship that is between original file path information and patch upgrade file path information and that is in the patch package in the second partition.

The apparatus provided in this embodiment can perform the foregoing method embodiments, and implementation principles and technical effects of the apparatus are similar and are not described herein again.

Figure 9:
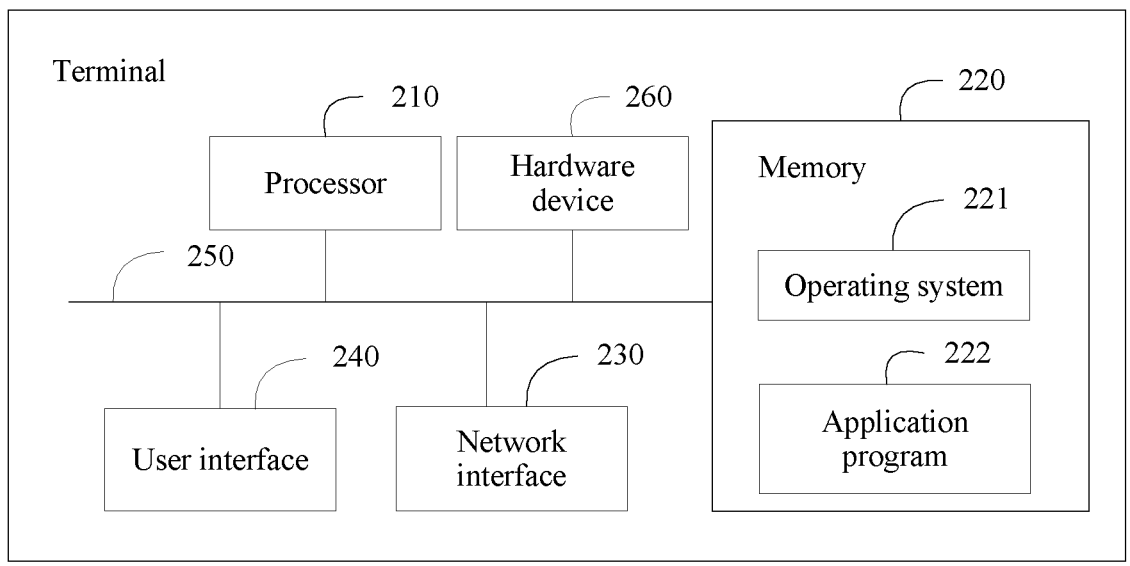
FIG. 9 is a schematic structural diagram of a terminal according to the present disclosure.

FIG. 9 is a schematic structural diagram of a terminal according to the present disclosure. As shown in FIG. 9, the terminal in this embodiment includes at least one processor 210, a memory 220, at least one network interface 230 or another user interface 240, at least one communications bus 250, and a hardware device 260 configured to display a screen of the terminal.

The communications bus 250 is configured to implement connection and communication between the components. The terminal optionally includes the user interface 240 that includes a display (for example, a touchscreen, an LCD, a CRT, a holographic imaging (Holographic Imaging), or a projector (Projector)), a keyboard, or a click device (for example, a mouse, a trackball (trackball), a touchpad, or a touchscreen).

The memory 220 may include a read-only memory and a random access memory, and provide an instruction and data for the processor 210.

Figure 1:
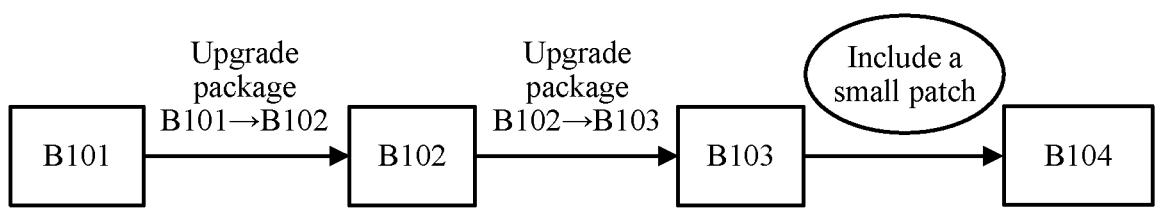
FIG. 1 is a schematic mode diagram of an existing differential package upgrade mode.
Figure 2:
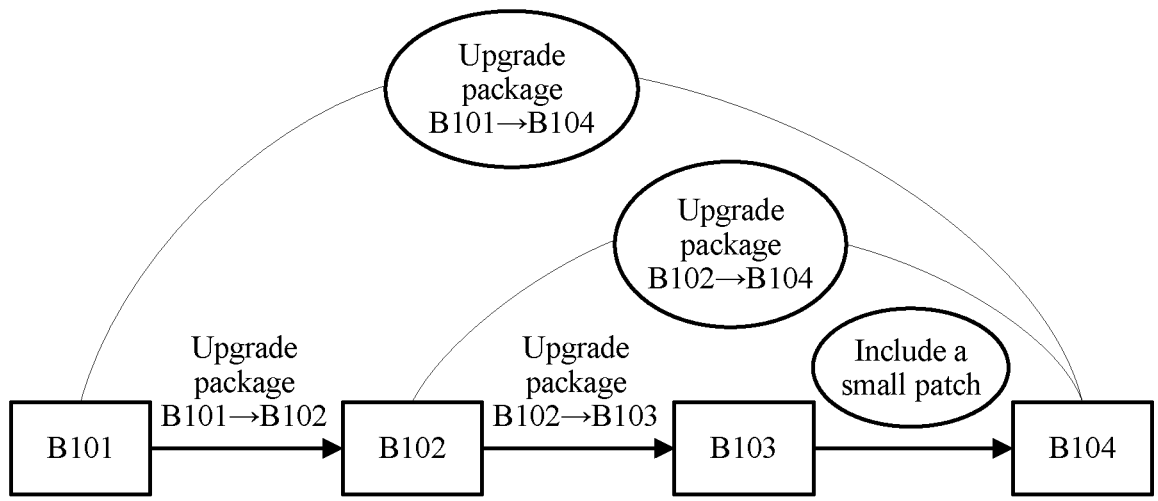
FIG. 2 is another schematic mode diagram of an existing differential package upgrade mode.

In some implementations, the memory 220 saves the following elements, an executable module or a data structure, or a subset thereof, or an extended set thereof:

an operating system 221, including various system programs that are used to implement various basic services and process hardware-based tasks; and an application program module 222, including various application programs, for example, the CA and the TA shown in FIG. 1, and configured to implement various application services.

The hardware device 260 configured to display the screen of the terminal may include a display memory, a display device, a touchscreen, and the like.

It may be understood that all the modules of the apparatus shown in FIG. 7 may be the components of the processor 210 in this embodiment. The processor 210 executes a program or an instruction in the memory 220, so as to implement the functions of all the modules of the apparatus shown in FIG. 7.

In this embodiment of the present disclosure, the processor 210 invokes the program or the instruction saved in the memory 220, so as to:

receive a file access request, where the file access request includes storage path information;

if the storage path information indicates a first partition, determine whether the storage path information exists in an association relationship that is between original file path information and patch upgrade file path information and that is in a preconfigured system;

if the storage path information exists in the association relationship that is between the original file path information and the patch upgrade file path information and that is in the preconfigured system, query the association relationship that is between the original file path information and the patch upgrade file path information and that is in the preconfigured system, to obtain patch upgrade file path information corresponding to the storage path information; and obtain, from a target partition indicated by the corresponding patch upgrade file path information, a patch upgrade file that matches the patch upgrade file path information.

Based on a same disclosure concept, a problem-resolving principle of the terminal is similar to a communication method in the method embodiment of the present disclosure. Therefore, for implementations of the terminal, refer to implementations of the method, for example, obtaining a patch package, generating a patch upgrade file in a second partition, and/or another process of the technology described in the method embodiment of the present disclosure. For example, the processor 1103 is configured to perform S101 to S104 in the process in FIG. 4 and S201 to S204 in the process in FIG. 6. The memory 1104 is configured to store program code and data for the terminal. Details are not described herein.

According to the terminal provided in this embodiment, after the terminal receives the file access request, when the storage path information in the file access request indicates the first partition, the terminal first determines whether the storage path information exists in the association relationship that is between the original file path information and the patch upgrade file path information and that is in the preconfigured system. If the storage path information exists in the association relationship, the terminal obtains, according to the association relationship, the patch upgrade file path information corresponding to the storage path information, and then obtains the corresponding patch upgrade file according to the patch upgrade file path information by means of accessing. Based on this file processing manner, when an original file is accessed, the terminal accesses a patch file according to path information, so as to implement software patch upgrading. The patch package in this embodiment may include a patch file used to fix an emergency bug, so that the patch package is relatively small. The terminal can quickly obtain the path information in the patch package, and when the original file is accessed, directly access the patch file according to the path information, so that an upgrading speed is high. In addition, there is no need to prepare multiple upgrade packages for earlier versions, so that workload is small.

An embodiment of the present disclosure provides a nonvolatile computer readable storage medium that stores one or more programs, where the one or more programs include an instruction, and when the instruction is executed by a terminal, the terminal performs the foregoing method.

Persons of ordinary skill in the art may understand that all or some of the steps of the method embodiments may be implemented by a program instructing relevant hardware. The program may be saved in a nonvolatile computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A patch-upgrade-based file processing method, comprising:
   obtaining an emergency patch package, wherein the emergency patch package comprises a parameter modification script and an emergency patch package identifier;
   saving the emergency patch package in memory having a storage path information, wherein the storage path information comprises a virtual file system (VFS);
   receiving a file access request, the file access request comprising storage path information;
   determining whether the storage path information exists in an association relationship between original file path information and emergency patch upgrade file path information when the storage path information indicates a first partition, wherein the emergency patch upgrade file path information is in a preconfigured system, and wherein the emergency patch package is saved in a second partition;
   querying the association relationship to obtain emergency patch upgrade file path information corresponding to the storage path information when the storage path information exists in the association relationship between the original file path information and the emergency patch upgrade file path information;
   obtaining an original file from the first partition for processing;
   generating an emergency patch upgrade file in the second partition;
   obtaining, from a target partition indicated by the emergency patch upgrade file path information corresponding to the storage path information, the emergency patch upgrade file matching the emergency patch upgrade file path information corresponding to the storage path information; and
   implementing software patch upgrading based on the emergency patch upgrade file.

2. The method of claim 1, wherein the preconfigured system further comprises the VFS, and wherein the storage path information is saved in a path table.

3. The method of claim 1, wherein after generating the emergency patch upgrade file in the second partition, the file processing method further comprises:
   saving the generated emergency patch upgrade file in a third partition;
   and obtaining, from the third partition, the emergency patch upgrade file matching the emergency patch upgrade file path information corresponding to the storage path information.

4. The method of claim 1, wherein after saving the emergency patch package in the second partition, the file processing method further comprises saving, in the preconfigured system, an association relationship between the original file path information and the emergency patch upgrade file path information in the emergency patch package in the second partition.

5. The method of claim 1, wherein after saving the emergency patch package in the second partition, the file processing method further comprises saving, in the preconfigured system, an association relationship between the original file path information and the emergency patch upgrade file path information in the emergency patch package in a third partition.

6. The method of claim 1, wherein after saving the emergency patch package in the second partition, the file processing method further comprises saving, in the preconfigured system, an association relationship between the original file path information and the emergency patch upgrade file path information in the emergency patch package in the second partition.

7. The method of claim 1, wherein obtaining the original file from the first partition for processing, and generating the emergency patch upgrade file in the second partition comprises:
   mounting the first partition in which the original file is located;
   reading the original file in the first partition;

parsing the original file to obtain parameter information of the original file; and modifying a to-be-modified parameter in the parameter information to generate the emergency patch upgrade file.

8. The method of claim 1, wherein the preconfigured system comprises an intermediate virtual file system.

9. A terminal, comprising:
a memory comprising instructions; and
a processor coupled to the memory, the instructions causing the processor to be configured to:
  obtain an emergency patch package, wherein the emergency patch package comprises a parameter modification script and an emergency patch package identifier;
  save the emergency patch package in memory having a storage path information, wherein the storage path information comprises a virtual file system (VFS);
  receive a file access request, the file access request comprising storage path information;
  determine whether the storage path information exists in an association relationship between original file path information and emergency patch upgrade file path information when the storage path information indicates a first partition, wherein the emergency patch upgrade file path information is in a preconfigured system;
  query the association relationship to obtain emergency patch upgrade file path information corresponding to the storage path information when the storage path information exists in the association relationship between the original file path information and the emergency patch upgrade file path information:
  obtain an original file from the first partition for processing;
  generate an emergency patch upgrade file in a second partition;
  obtain, from a target partition indicated by the emergency patch upgrade file path information corresponding to the storage path information, an emergency patch upgrade file matching the emergency patch upgrade file path information corresponding to the storage path information; and
  implement software patch upgrading based on the emergency patch upgrade file.

10. The terminal of claim 9, wherein the VFS further comprises overlayFS technology.

11. The terminal of claim 10, wherein the instructions further cause the processor to be configured to save, in the preconfigured system, an association relationship between the original file path information and the emergency patch upgrade file path information in the emergency patch package in a second partition.

12. The terminal of claim 9, wherein the instructions further cause the processor to be configured to save the generated emergency patch upgrade file in a third partition, and obtaining the emergency patch upgrade file comprises obtaining, from the third partition, the emergency patch upgrade file matching the emergency patch upgrade file path information corresponding to the storage path information.

13. The terminal of claim 9, wherein the instructions further cause the processor to be configured to:

mount the first partition in which the original file is located;
read the original file in the first partition;
parse the original file to obtain parameter information of the original file; and
modify a to-be-modified parameter in the parameter information to generate the emergency patch upgrade file.

14. The terminal of claim 9, wherein the preconfigured system comprises an intermediate virtual file system.

15. A nonvolatile computer readable storage medium storing a program comprising instructions, that, when executed by a terminal, cause the terminal to be configured to:
  obtain an emergency patch package, wherein the emergency patch package comprises a parameter modification script and an emergency patch package identifier;
  save the emergency patch package in memory having a storage path information, wherein the storage path information comprises a virtual file system (VFS);
  receive a file access request, the file access request comprising storage path information;
  determine whether the storage path information exists in an association relationship between original file path information and emergency patch upgrade file path information when the storage path information indicates a first partition, wherein the emergency patch upgrade file path information is in a preconfigured system;
  query the association relationship to obtain emergency patch upgrade file path information corresponding to the storage path information when the storage path information exists in the association relationship between the original file path information and the emergency patch upgrade file path information;
  obtain an original file from the first partition for processing;
  generate an emergency patch upgrade file in a second partition;
  obtain, from a target partition indicated by the emergency patch upgrade file path information corresponding to the storage path information, an emergency patch upgrade file matching the emergency patch upgrade file path information corresponding to the storage path information; and
  implement software patch upgrading based on the emergency patch upgrade file.

16. The nonvolatile computer readable storage medium of claim 15, wherein the instructions further cause the terminal to be configured to implement the VFS using SDcardFS technology.

17. The nonvolatile computer readable storage medium of claim 15, wherein the instructions further cause the terminal to be configured to:
  save the generated emergency patch upgrade file in a third partition; and
  obtain, from the third partition, the emergency patch upgrade file matching the emergency patch upgrade file path information corresponding to the storage path information.

* * * * *